(12) United States Patent
Holloway Owens

(10) Patent No.: US 12,345,324 B2
(45) Date of Patent: Jul. 1, 2025

(54) ELECTRONIC VEHICLE SHIFT ACCESSORY

(71) Applicant: Torii Technology LLC, Dover, DE (US)

(72) Inventor: Maxwell Holloway Owens, Charlotte, NC (US)

(73) Assignee: TORII TECHNOLOGY LLC, Dover, DE (US)

( * ) Notice: Subject to any disclaimer, the term of this patent is extended or adjusted under 35 U.S.C. 154(b) by 0 days.

(21) Appl. No.: 18/365,427

(22) Filed: Aug. 4, 2023

(65) Prior Publication Data

US 2024/0271696 A1    Aug. 15, 2024

Related U.S. Application Data

(60) Provisional application No. 63/484,650, filed on Feb. 13, 2023.

(51) Int. Cl.
*F16H 59/02* (2006.01)

(52) U.S. Cl.
CPC ..... *F16H 59/0278* (2013.01); *F16H 59/0217* (2013.01); *F16H 2059/026* (2013.01)

(58) Field of Classification Search
CPC ............. F16H 59/0278; F16H 59/0217; F16H 2059/026
See application file for complete search history.

(56) References Cited

U.S. PATENT DOCUMENTS

| 2006/0265126 | A1 | 11/2006 | Olcott | |
|---|---|---|---|---|
| 2014/0318293 | A1* | 10/2014 | Nelson | F16H 59/0278 74/473.3 |
| 2015/0053038 | A1* | 2/2015 | Kim | F16H 59/10 74/473.3 |
| 2018/0003294 | A1* | 1/2018 | McGuire | F16H 59/0278 |
| 2019/0176997 | A1* | 6/2019 | Lambton | B64D 31/04 |

FOREIGN PATENT DOCUMENTS

DE    102015011872 A1 *  3/2017

OTHER PUBLICATIONS

English translation of DE-102015011872-A1. (Year: 2017).*
International Search Report and Written Opinion issued in related Application Serial No. PCT/US2024/015480 on May 20, 2024.

* cited by examiner

*Primary Examiner* — Randell J Krug
(74) *Attorney, Agent, or Firm* — Brian J. Colandreo; Jeffrey T. Placker; Holland & Knight LLP

(57) ABSTRACT

An electronic vehicle shift accessory may include a body portion including an external surface and an interior chamber; an electronic display screen positioned on an external surface of the body portion; and a computing device positioned within the interior chamber of the body portion. The computing device may be communicatively coupled to the electronic display screen and configured to communicate with an external electronic device. The body portion may be removably couplable to a gear selector and the computing device may be configured to render customizable content on the electronic display screen.

14 Claims, 6 Drawing Sheets

600s

ELECTRONIC VEHICLE SHIFT ACCESSORY

CROSS REFERENCE TO RELATED APPLICATIONS

The present application claims priority to U.S. patent application Ser. No. 63/484,650 that was filed on Feb. 13, 2023, entitled "Customizable Shift Knob" which is hereby incorporated by reference in its entirety.

BACKGROUND

Vehicle enthusiasts have found every way to modify their vehicles. One part in particular, the shift knob, is a common modification that vehicle owners make to their vehicles. Changing the shift knob can lead to performance improvements as well as cosmetic enhancements. However, conventional shift knobs are unable to provide dynamic content or customization.

SUMMARY

In one embodiment, an electronic vehicle shift accessory may include a body portion including an external surface and an interior chamber; an electronic display screen positioned on an external surface of the body portion; and a computing device positioned within the interior chamber of the body portion. The computing device may be communicatively coupled to the electronic display screen and configured to communicate with an external electronic device. The body portion may be removably couplable to a gear selector and the computing device may be configured to render customizable content on the electronic display screen.

One or more of the following features may be included. One or more buttons may be positioned on the external surface of the body portion and communicatively coupled to the computing device. An audio system may be positioned on the body portion and communicatively coupled to the computing device. The electronic display screen may be at least partially recessed within the body portion and may form at least a portion of the external surface of the body portion. The computing device may include a global positioning system (GPS). The computing device may include a wireless communication transceiver. The wireless communication transceiver may enable wireless communication between the computing device and the external electronic device. The external electronic device may be a mobile phone and the computing device may be configured to render call information on the electronic display screen. A vibration motor may be communicatively coupled to the computing device and configured to provide vibrations to the body portion.

In another embodiment, an electronic vehicle shift accessory may include a body portion including an external surface and an interior chamber; an electronic display screen at least partially recessed within the body portion forming at least a portion of the external surface of the body portion; and a computing device positioned within the interior chamber of the body portion. The computing device may be communicatively coupled to the electronic display screen and may be configured to communicate with an external electronic device. The body portion may be removably couplable to a gear selector. The computing device may be configured to render customizable content on the electronic display screen.

One or more of the following features may be included. One or more buttons may be positioned on the external surface of the body portion and communicatively coupled to the computing device. An audio system may be positioned on the body portion and communicatively coupled to the computing device. The electronic display screen may be at least partially recessed within the body portion and may form at least a portion of the external surface of the body portion. The computing device may include a global positioning system (GPS). The computing device may include a wireless communication transceiver. The wireless communication transceiver may enable wireless communication between the computing device and the external electronic device. The external electronic device may be a mobile phone and the computing device may be configured to render call information on the electronic display screen. A vibration motor may be communicatively coupled to the computing device and configured to provide vibrations to the body portion.

BRIEF DESCRIPTION OF THE DRAWINGS

Embodiments of the present disclosure are described with reference to the following figures.

Like reference symbols in the various drawings may indicate like elements.

DETAILED DESCRIPTION OF EXAMPLE EMBODIMENTS

Embodiments of the present disclosure provide an electronic vehicle shift accessory that utilizes a digital screen to display customizable digital media. In some embodiments, users are able to connect an external electronic device to the electronic vehicle shift accessory and wirelessly customize the media (i.e., images, videos, graphics, animations, etc.) that is being displayed on the electronic vehicle shift accessory using an application. The electronic vehicle shift accessory allows users to quickly and easily personalize the interior of their vehicle. In addition to cosmetic personalization, embodiments of the electronic vehicle shift accessory add functionality to the vehicle. For example, embodiments of the electronic vehicle shift accessory allow it to function as a controller for various applications. Using different touch gestures and/or buttons on the electronic vehicle shift accessory, various controls ranging from playing/changing music, to answering calls, reading texts out loud, may be performed using the electronic vehicle shift accessory. In some embodiments, the electronic vehicle shift accessory may also include speakers that play custom audio at different times. In this example, the user can set their electronic vehicle shift accessory to play a particular audio file when the vehicle turns on, when they shift gears, receive a call, etc. In one example, playing loud noises through the electronic vehicle shift accessory speakers, along with an optional built-in GPS may also help vehicle owners find their car if it has been lost during parking. In some embodiments, the electronic vehicle shift accessory may also use vibrations to do things like indicate when to shift, or to notify the driver of a received text message. In one example, the electronic vehicle shift accessory can function as a race timer that tracks the time that it takes for a vehicle to race around a track or to go from 0-60 miles per hour.

Referring to FIGS. 1-6, an electronic vehicle shift accessory may include a body portion including an external surface and an interior chamber; an electronic display screen positioned on an external surface of the body portion; and a computing device positioned within the interior chamber of the body portion. The computing device may be communicatively coupled to the electronic display screen and configured to communicate with an external electronic device. The body portion may be removably couplable to a gear selector and the computing device may be configured to render customizable content on the electronic display screen.

Figure 1:
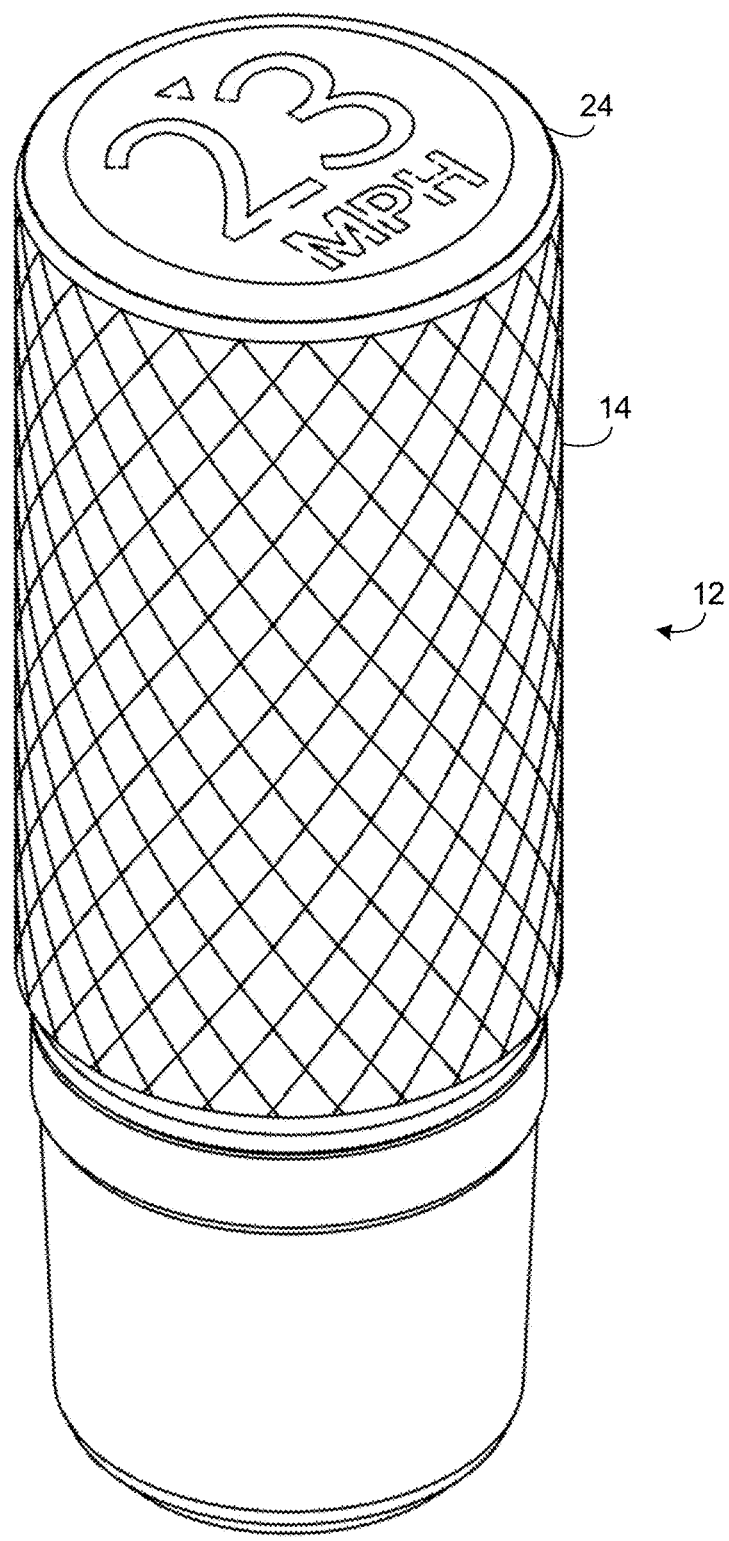
FIG. 1 is a perspective view of an electronic vehicle shift accessory according to an embodiment of the present disclosure.
Figure 2:
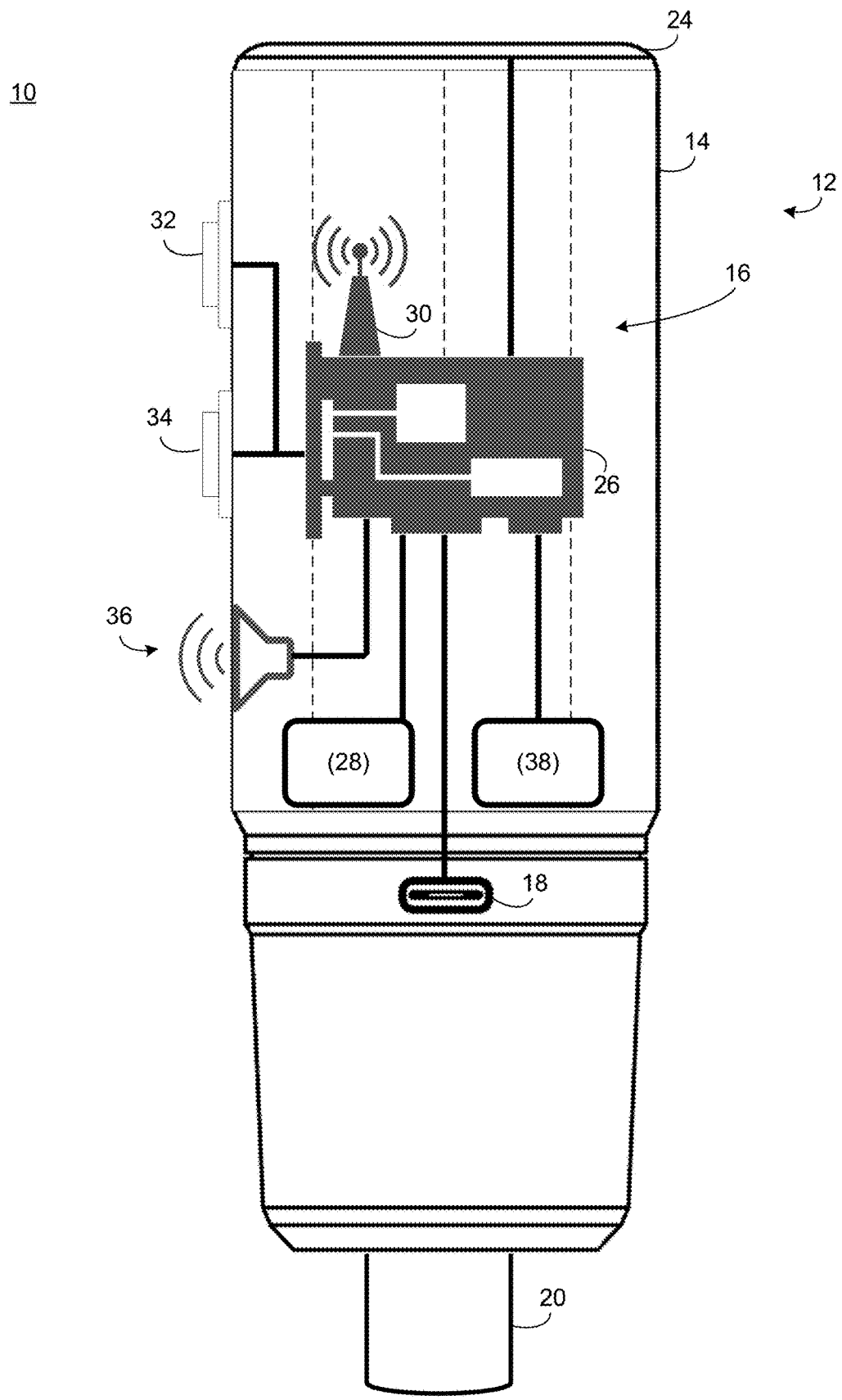
FIG. 2 is a side view of the interior chamber of an electronic vehicle shift accessory according to an embodiment of the present disclosure.

In some embodiments, an electronic vehicle shift accessory may include a body portion including an external surface and an interior chamber. Referring also to FIG. 1, an electronic vehicle shift accessory (e.g., electronic vehicle shift accessory 10) is shown. Electronic vehicle shift accessory 10 includes a body portion (e.g., body portion 12) including an external surface (e.g., external surface 14) and an interior chamber (e.g., interior chamber 16 as shown in FIG. 2). In some embodiments, body portion 12 is formed from plastic, wood, metal, metal-alloy, and/or any combination of materials. The external surface (e.g., external surface 14) may be smooth or textured. For example, the external surface shown in FIGS. 1 and 5 includes a grooved pattern along the majority of body portion 12. As such, it will be appreciated that external surface 14 may include a combination of different textures. Referring also to FIG. 2, interior chamber 16 may include a hollow portion of body portion 12 that is configured to house a computing device and various electronic components to enable the operation of an electronic display screen.

In some embodiments, body portion 12 may include a power port (e.g., power port 18) configured to provide power from an external source (e.g., a vehicle power supply or any other type of power supply) to electronic components within interior chamber 16. In some implementations, body portion 12 includes a data port configured to provide a data connection from an external electronic device to a computing device within interior chamber 16. In one example, the power port and the data port are defined in the same port structure (e.g., power port 18). An example of power port 18 includes a universal serial bus (USB) type "C" port. However, it will be appreciated that any type of power and/or data port may be used within the scope of the present disclosure.

Figure 3:
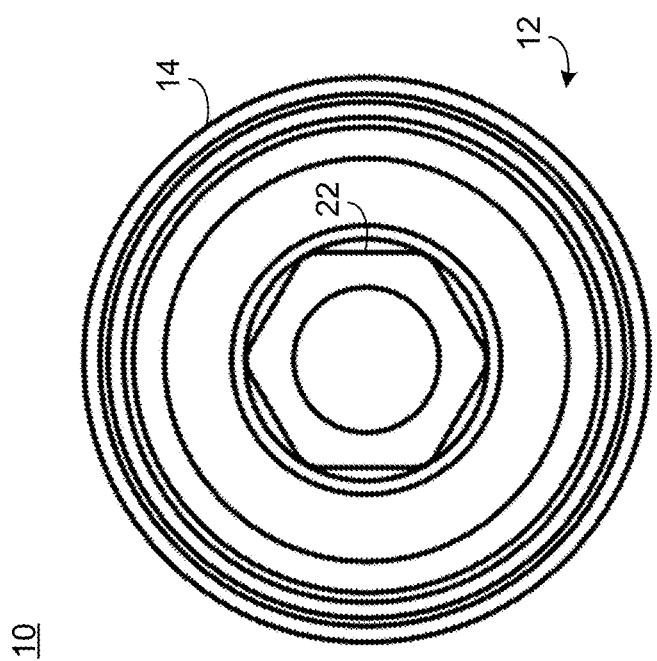
FIG. 3 is a bottom view of an electronic vehicle shift accessory according to an embodiment of the present disclosure.

In some implementations, body portion 12 may be removably couplable to a gear selector (e.g., gear selector 20). A gear selector (e.g., gear selector 20) may generally include a rod or shaft physically coupled or electronically coupled to a vehicle's transmission. Referring also to FIG. 3, a bottom view of electronic vehicle shift accessory 10 is shown with a coupling mechanism (e.g., coupling mechanism 22) for removably coupling to a gear selector (e.g., gear selector 20 in FIG. 2). In one embodiment, coupling mechanism is a threaded nut that secures to a corresponding threaded bolt of gear selector 20. However, it will be appreciated any fastener or coupling system may be used to removably couple body portion 12 to gear selector 20 within the scope of the present disclosure.

In some embodiments, the electronic vehicle shift accessory may include an electronic display screen positioned on the external surface of the body portion. Referring again to FIG. 1, an electronic display screen (e.g., electronic display screen 24) is positioned on the external surface (e.g., external surface 14). Electronic display screen 24 may generally include a display device for presentation of images, text, and/or video transmitted electronically. Electronic display screen may be a liquid crystal display (LCD) or an organic light emitting diode (OLED) display. In some implementations, electronic display screen 24 may be at least partially recessed within body portion 12 forming at least a portion of external surface 14 of body portion 12. Referring also to FIG. 2, electronic display screen 24 is shown at least partially recessed within an upper external surface of body portion 12. In this example, electronic display screen 24 forms the top surface of electronic vehicle shift accessory 10. In some embodiments, electronic display screen 24 may include a touch screen. For example, electronic display screen 24 can receive touch gestures to operate particular menus, features, etc. (e.g., change music, answer phone calls, etc.).

In some embodiments, the electronic vehicle shift accessory may include a computing device positioned within the interior chamber of the body portion. A computing device (e.g., computing device 26 shown in FIG. 2) may generally include an electronic instrument with a central processing unit (CPU) configured to perform substantial computations, including numerous arithmetic operations and logic operations without human intervention. In some embodiments, computing device 26 can be a standalone unit or may be one of several interconnected units. In some embodiments, computing device 26 may be communicatively coupled to electronic display screen 24 and configured to communicate with an external electronic device. Communicatively coupled generally includes a wired or wireless connection between two devices and may be a direct coupling between the devices or an indirect coupling through intervening devices. For example, computing device 26 may interface with electronic display screen 24 by generating and sending signals to electronic display screen 24 that cause electronic display screen 24 to generate particular images, text, videos, etc.

Figure 4:
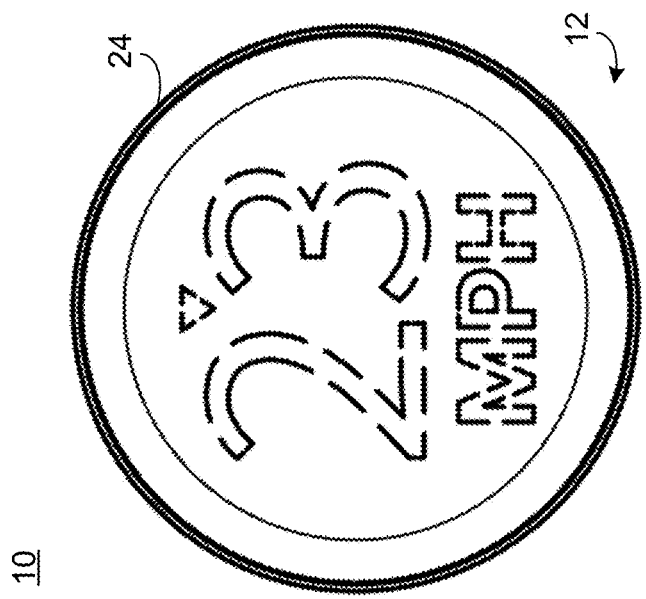
FIG. 4 is a top view of an electronic vehicle shift accessory according to an embodiment of the present disclosure.

In some embodiments, computing device 26 allows users to personalize the content displayed in electronic display screen 24. For example, computing device 26 may include an application that provides multiple options for content to display using electronic display screen 24. In one example, computing device 26 includes a memory that is programed with predefined types of content that a user can select (using input controls on electronic vehicle shift accessory 10 and/or using an external electronic device). In another example, computing device 26 includes a memory that is programmable with content uploaded from an external electronic device. In this example, content may be uploaded using a wired connection (e.g., using port 18) and/or a wireless connection (e.g., Bluetooth®, W-Fi®, etc.). In another example, computing device 26 may access content stored in a remote storage location (e.g., a cloud storage device and/or an external electronic device). In this example, computing device 26 can access content from various sources. As will be discussed in greater detail below, computing device 26 may provide various functionality in addition to display particular content on electronic display screen 24. In one example, computing device 26 interfaces with a vehicle management system and/or a GPS chipset to determine the speed of the vehicle and to cause the vehicle speed to be displayed on electronic display screen 24 as shown in FIG. 4. However, it will be appreciated that various types of content concerning the operation of a vehicle (e.g., current speed, warnings, tripmeter information, alerts, transmission shift recommendations, etc.) may be rendered on electronic display screen 24.

In some embodiments, the computing device may include a global positioning system (GPS). For example, computing device 26 may include a GPS chipset (e.g., GPS 28) integrally within computing device 26 or as a separate component (e.g., GPS 28) communicatively coupled to computing device 26 (as shown in FIG. 2). In some embodiments, computing device 26 may interface with GPS 28 to determine location information for electronic vehicle shift accessory 10. For example, computing device 26 may receive a request from an external electronic device to provide location information for electronic vehicle shift accessory 10. Accordingly, computing device 26 may energize GPS 28 to obtain location information for electronic vehicle shift accessory 10. In some embodiments, computing device 26 may periodically energize GPS 28 to determine and store location information for electronic vehicle shift accessory 10 based upon, at least in part, a location information gathering interval. The location information gathering interval may be a default interval or a user-defined interval. For example, the location information gathering interval may be defined using electronic display screen 24 and/or an external electronic device. In one example, computing device 26 may interface with an application executing on an external electronic device to determine location information for electronic vehicle shift accessory 10. For example, computing device 26 may be configured to periodically, or upon request, determine location information for a group of vehicles and to communicate the location information to an external electronic device. In this manner, GPS 28 may provide location information as part of a vehicular fleet management application. However, it will be appreciated that GPS 28 may be used to provide location information for electronic vehicle shift accessory 10 for various applications within the scope of the present disclosure.

In some embodiments, the computing device may include a wireless communication transceiver. A wireless communication transceiver (e.g., wireless communication transceiver 30) may generally include electronic components that receive and transmit wireless communications. Examples of wireless communications include cellular signals (e.g., 3G, 4G, or 5G broadband cellular network technology), IEEE 802.11a, 802.11b, 802.11g, 802.11n, Wi-Fi, and/or Bluetooth. In some embodiments, wireless communication transceiver 30 may enable wireless communication between computing device 26 and an external electronic device. For example, the external electronic device may be a mobile phone and computing device 26 may be configured to render call information on electronic display screen 24. In another example, the external electronic device may be a vehicle management system and computing device 26 may be configured to render vehicle operation information by communicating wirelessly with the vehicle management system using wireless communication transceiver. In one example, wireless communication transceiver 30 of electronic vehicle shift accessory 10 enables communication (e.g., via Bluetooth) between an external sensor (e.g., an oil temperature sensor) and computing device 26 of electronic vehicle shift accessory 10 such that electronic display screen 24 displays information from the external sensor (e.g., oil temperature information).

Figure 5:
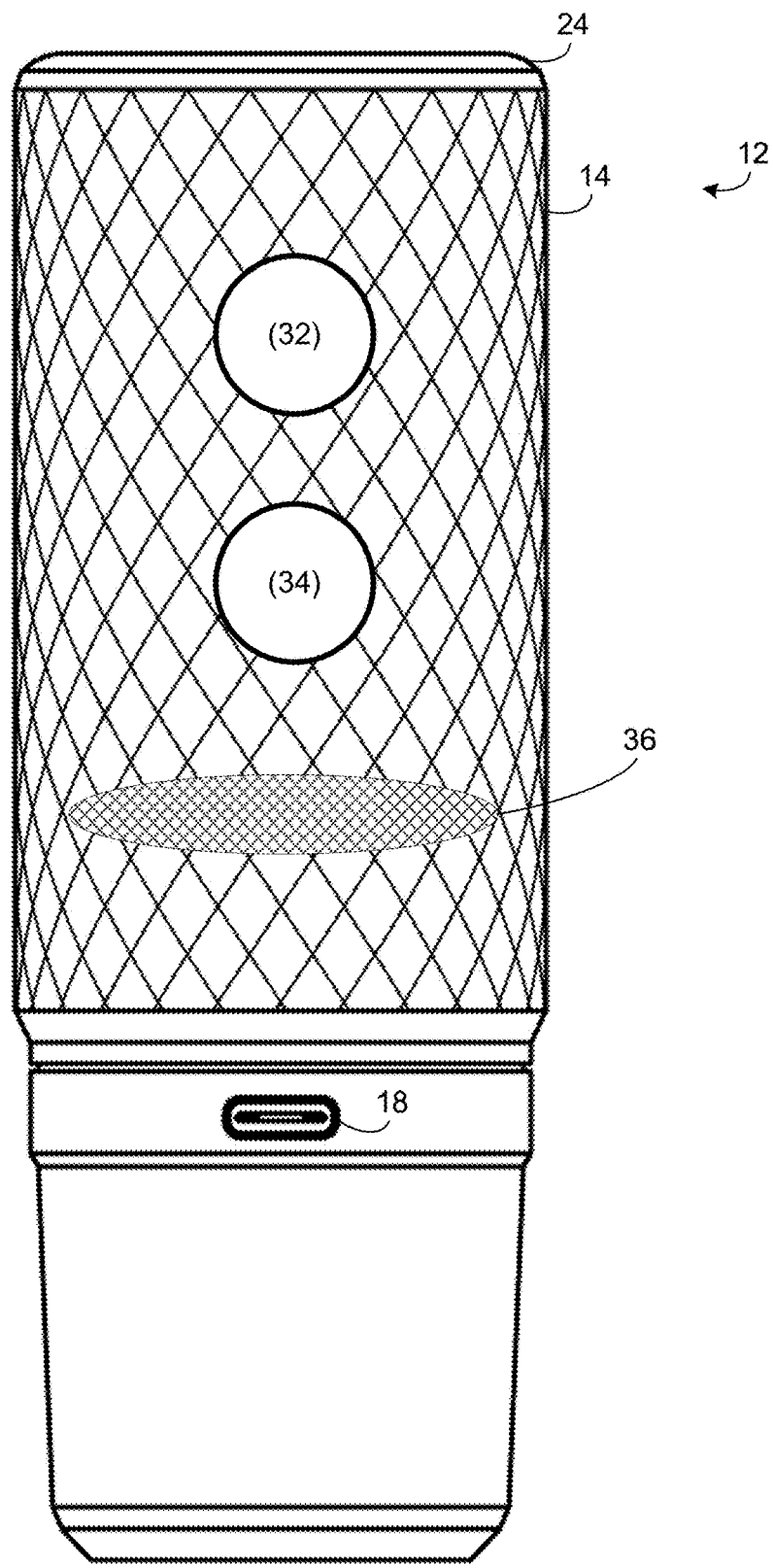
FIG. 5 is a side view of the electronic vehicle shift accessory according to an embodiment of the present disclosure.

In some embodiments, the electronic vehicle shift accessory may include one or more buttons positioned on the external surface of the body portion and communicatively coupled to the computing device. Referring also to FIGS. 2 and 5, one or more buttons (e.g., buttons 32, 34) may be positioned on external surface 14 of body portion 12. Buttons 32, 34 may be communicatively coupled to computing device 26 to provide interactive control between a user and the content displayed on electronic display screen 24. For example, using buttons 32, 34 may select particular content to render on electronic display screen 24. In some embodiments, computing device 26 may provide a menu on electronic display screen 24 and a user may select particular options or features on the menu using buttons 32, 34. While FIG. 2 shows two buttons positioned vertically along external surface 14, it will be appreciated that any number of buttons may be positioned anywhere on electronic vehicle shift accessory 10 within the scope of the present disclosure.

In some embodiments, the electronic vehicle shift accessory may include an audio system positioned on the body portion and communicatively coupled to the computing device. Referring again to FIGS. 2 and 5, electronic vehicle shift accessory 10 may include an audio system (e.g., audio system 36) positioned on body portion 12. Audio system 36 may be communicatively coupled to computing device 26. For example, computing device 26 may provide signals to audio system 36 to play sounds or music. In one example, computing device 26 interfaces with a vehicle management system and/or GPS 28 to determine a user's speed and/or when a user needs to shift the vehicle's transmission. Accordingly, computing device 26 communicates with audio system 36 to provide a predefined sound or portion of music. The sound may be a default sound or a user-defined sound. In some embodiments, computing device 26 communicates with audio system 36 to provide audible feedback while using electronic vehicle shift accessory (e.g., in response to selecting content for rendering on electronic display screen 24, shifting the transmission into a different gear, indicating when to select a different gear, etc.). In some embodiments, audio system 36 may provide any sound or music associated with the rendered content from electronic display screen 24. In one example, audio system 36 may provide sound signals from a call processed using electronic vehicle shift accessory. For instance, audio system 36 may include a microphone and a speakerphone combination to allow a user to receive calls using the electronic vehicle shift accessory. As such, it will be appreciated that audio system may receive input sounds using a microphone assembly and output sounds using a speaker assembly.

In some embodiments, the electronic vehicle shift accessory may include a vibration motor communicatively coupled to the computing device and configured to provide vibrations to the body portion. For example, electronic vehicle shift accessory 10 may include a vibration motor (e.g., vibration motor 38) configured to provide vibration feedback. For example, computing device 26 may be configured to energize vibration motor 38 to provide different types of vibration feedback to body portion 12. In one example, computing device 26 energizes vibration motor 38 when a call is received by an external electronic device in communication with electronic vehicle shift accessory 10. In another example, computing device 26 energizes vibration motor 38 when a vehicle management system in communication with electronic vehicle shift accessory 10 determines that it is time to shift the transmission into a different gear. In another example, computing device 26 energizes vibration motor 38 when a navigational system (e.g., within electronic vehicle shift accessory 10 or an external electronic device) determines that a user is approaching a change in direction during guided navigation. In some implementations, different types of vibrations (e.g., duration and pulse) may be provided to communicate different information. For example, one type of vibration feedback may be associated with receiving a call (e.g., vibration for phone ringing); another type of vibration for indicating when to change gear (e.g., upshift or downshift); and another type of vibration for processing alerts or warnings from the vehicle. In this manner, it will be appreciated that various types of vibrations may be used within the scope of the present disclosure for different applications.

As discussed above, electronic vehicle shift accessory 10 may enable a user to interact with external electronic devices (e.g., mobile phones, external sensors, media players, vehicle management systems, etc.) to perform various functions (e.g., answering phone calls, controlling media playback, adjusting media volume, selecting images for display in the electronic display screen, determine and display temperature, display text messages, open and close garage doors, engage vehicle locks and controls, display compass/navigation features, etc. In this manner, electronic vehicle shift accessory 10 allows simplified access to various electronic tools and services from the convenient location of the vehicle shift accessory.

The Content Management Process

Figure 6:
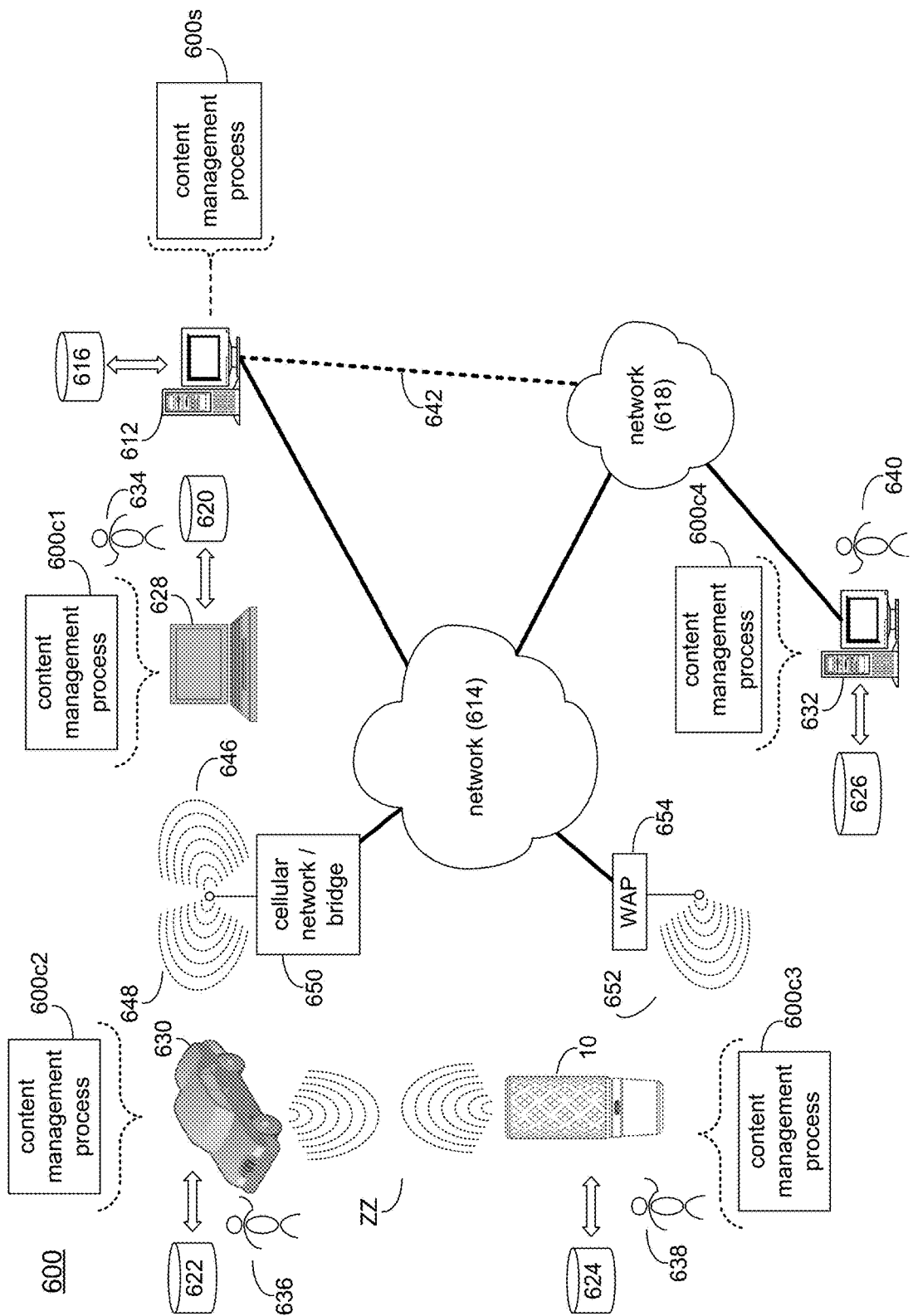
FIG. 6 is a diagrammatic view of computer system and a content management process coupled to a distributed computing network.
Figure 7:
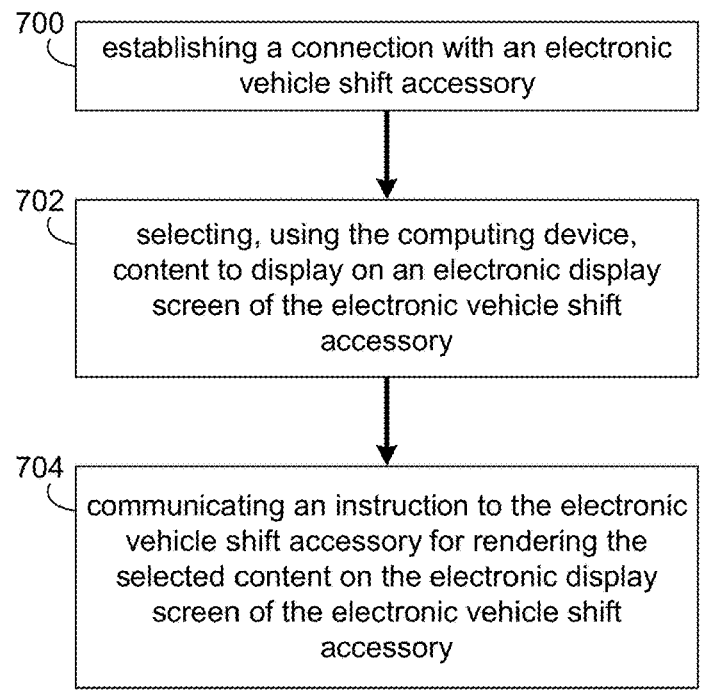
FIG. 7 is a flow chart of one implementation of the content management process.

Referring to FIG. 6, there is shown content management process 600. Content management process 600 may be implemented as a server-side process, a client-side process, or a hybrid server-side/client-side process. For example, content management process 600 may be implemented as a purely server-side process via content management process 600s. Alternatively, content management process 600 may be implemented as a purely client-side process via one or more of content management process 600c1, content management process 600c2, content management process 600c3, and content management process 600c4. Alternatively still, content management process 600 may be implemented as a hybrid server-side/client-side process via content management process 600s in combination with one or more of content management process 600c1, content management process 600c2, content management process 600c3, and content management process 600c4. Accordingly, content management process 600 as used in this disclosure may include any combination of content management process 600s, content management process 600c1, content management process 600c2, content management process 600c3, and content management process 600c4.

Content management process 600s may be a server application and may reside on and may be executed by computing device 612, which may be connected to network 614 (e.g., the Internet or a local area network). Examples of computing device 612 may include, but are not limited to: a personal computer, a server computer, a series of server computers, a minicomputer, a mainframe computer, a smartphone, or a cloud-based computing platform.

The instruction sets and subroutines of content management process 600s, which may be stored on storage device 616 coupled to computing device 612, may be executed by one or more processors (not shown) and one or more memory architectures (not shown) included within computing device 612. Examples of storage device 616 may include but are not limited to: a hard disk drive; a RAID device; a random-access memory (RAM); a read-only memory (ROM); and all forms of flash memory storage devices. Network 614 may be connected to one or more secondary networks (e.g., network 618), examples of which may include but are not limited to: a local area network; a wide area network; or an intranet, for example.

Examples of content management processes 600c1, 600c2, 600c3, 600c4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of content management processes 600c1, 600c2, 600c3, 600c4, which may be stored on storage devices 620, 622, 624, 626 (respectively) coupled to client electronic devices 10, 628, 630, 632 (respectively), may be executed by one or more processors (not shown) and one or more memory architectures (not shown) incorporated into client electronic devices 10, 628, 630, 632 (respectively). Examples of storage devices 620, 622, 624, 626 may include but are not limited to: hard disk drives; RAID devices; random access memories (RAM); read-only memories (ROM), and all forms of flash memory storage devices.

Examples of client electronic devices 10, 628, 630, 632 may include, but are not limited to, an electronic vehicle shift accessory 10, a smartphone (not shown), a personal digital assistant (not shown), a tablet computer (not shown), laptop computer 628, vehicle management system 630, personal computer 632, a notebook computer (not shown), a server computer (not shown), a gaming console (not shown), and a dedicated network device (not shown). Client electronic devices 10, 628, 630, 632 may each execute an operating system, examples of which may include but are not limited to Microsoft Windows™, Android™, iOS™, Linux™, or a custom operating system.

Users 634, 636, 638, 640, may access content management process 600 directly through network 614 or through secondary network 618. Further, content management process 600 may be connected to network 614 through secondary network 618, as illustrated with link line 642.

The various client electronic devices (e.g., client electronic devices 10, 628, 630, 632) may be directly or indirectly coupled to network 614 (or network 618). For example, laptop computer 628 and vehicle management system 630 are shown wirelessly coupled to network 614 via wireless communication channels 646, 648 (respectively) established between laptop computer 28 and vehicle management system 630 (respectively) and cellular network/bridge 650, which is shown directly coupled to network 614. Further, electronic vehicle shift accessory 10 is shown wirelessly coupled to network 614 via wireless communication channel 652 established between electronic vehicle shift accessory 10 and wireless access point (i.e., WAP) 654, which is shown directly coupled to network 614. Additionally, personal computer 34 is shown directly coupled to network 618 via a hardwired network connection.

WAP 654 may be, for example, an IEEE 802.11a, 802.11b, 802.11g, 802.11n, Wi-Fi®, and/or Bluetooth® device that is capable of establishing wireless communication channel 652 between electronic vehicle shift accessory 10 and WAP 654. As is known in the art, IEEE 802.11x specifications may use Ethernet protocol and carrier sense multiple access with collision avoidance (i.e., CSMA/CA) for path sharing. As is known in the art, Bluetooth® is a telecommunications industry specification that allows e.g., electronic devices, mobile phones, computers, and personal digital assistants to be interconnected using a short-range wireless connection.

In some implementations, content management process 10 may establish 700 a connection with an electronic vehicle shift accessory. For example and as discussed above, content management process 10 may allow an external electronic device (e.g., computing device 12) to establish 700 a connection (e.g., a wired connection, a cellular connection, a Bluetooth® connection, etc.) with electronic vehicle shift accessory 10. In some implementations, content management process 10 may provide an application that allows electronic vehicle shift accessory 10 to be identified and selected for establishing a connection. In one example, content management process 10 provides a login for securely accessing electronic vehicle shift accessory 10.

In some implementations, content management process 10 may select 702, using the computing device, content to display on an electronic display screen of the electronic vehicle shift accessory. For example, content management process 10 may render an application on the computing device (e.g., external electronic device) with options for different content items for rendering on electronic display screen 24 of electronic vehicle shift accessory 10. In some implementations, content management process 10 may provide an option for uploading content to electronic vehicle shift accessory 10. As discussed above, examples of content may include images, videos, music, etc.

In some implementations, content management process 10 may communicate 704 an instruction to the electronic vehicle shift accessory for rendering the selected content on the electronic display screen of the electronic vehicle shift accessory. For example, after selecting a particular content item on an external electronic device, content management process 10 communicates 704 an instruction to electronic vehicle shift accessory 10 for rendering the selected content on electronic display screen 24. In some implementations, content management process 10 communicates the content along with the instruction to electronic vehicle shift accessory 10 for rendering the content on electronic display screen 24.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An electronic vehicle shift accessory comprising:
   a body portion including an external surface and an interior chamber;
   an electronic display screen positioned on an external surface of the body portion; and
   a computing device positioned within the interior chamber of the body portion, wherein the computing device is communicatively coupled to the electronic display screen and configured to communicate with an external electronic device;
   wherein the body portion is removably couplable to a gear selector;
   wherein the computing device is configured to render customizable content on the electronic display screen; and
   wherein the computing device includes a global positioning system (GPS).

2. The electronic vehicle shift accessory of claim 1, further comprising:
   one or more buttons positioned on the external surface of the body portion and communicatively coupled to the computing device.

3. The electronic vehicle shift accessory of claim 1, further comprising:
   an audio system positioned on the body portion and communicatively coupled to the computing device.

4. The electronic vehicle shift accessory of claim 1, further comprising:
   a vibration motor communicatively coupled to the computing device and configured to provide vibrations to the body portion.

5. The electronic vehicle shift accessory of claim 1, wherein the computing device includes a wireless communication transceiver.

6. The electronic vehicle shift accessory of claim 5, wherein the wireless communication transceiver enables wireless communication between the computing device and the external electronic device.

7. The electronic vehicle shift accessory of claim 6, wherein the external electronic device is a mobile phone and the computing device is configured to render call information on the electronic display screen.

8. An electronic vehicle shift accessory comprising:
   a body portion including an external surface and an interior chamber;
   an electronic display screen at least partially recessed within the body portion forming at least a portion of the external surface of the body portion; and
   a computing device positioned within the interior chamber of the body portion, wherein the computing device is communicatively coupled to the electronic display screen and configured to communicate with an external electronic device;
   wherein the body portion is removably couplable to a gear selector;
   wherein the computing device is configured to render customizable content on the electronic display screen; and
   wherein the computing device includes a global positioning system (GPS).

9. The electronic vehicle shift accessory of claim 8, further comprising:
   one or more buttons positioned on the external surface of the body portion and communicatively coupled to the computing device.

10. The electronic vehicle shift accessory of claim 8, further comprising:
    an audio system positioned on the body portion and communicatively coupled to the computing device.

11. The electronic vehicle shift accessory of claim 8, further comprising:
- a vibration motor communicatively coupled to the computing device and configured to provide vibrations to the body portion.

12. The electronic vehicle shift accessory of claim 8, wherein the computing device includes a wireless communication transceiver.

13. The electronic vehicle shift accessory of claim 12, wherein the wireless communication transceiver enables wireless communication between the computing device and the external electronic device.

14. The electronic vehicle shift accessory of claim 13, wherein the external electronic device is a mobile phone and the computing device is configured to render call information on the electronic display screen.

* * * * *